United States Patent [19]
Lin

[11] Patent Number: 5,858,157
[45] Date of Patent: Jan. 12, 1999

[54] METHOD OF MOUNTING AN ART SHEET

[76] Inventor: Chih Hsien Lin, 6F-2, No. 551, Jeou-Ju 1st Rd., Kaohsiung, Taiwan

[21] Appl. No.: 842,882

[22] Filed: Apr. 17, 1997

[51] Int. Cl.$^6$ ............... B32B 31/00; G09F 1/10
[52] U.S. Cl. .............. 156/249; 40/773; 156/108; 156/152; 156/247; 156/277
[58] Field of Search ................. 156/152, 249, 156/247, 277, 108; 40/751, 760, 771, 777, 773, 798

[56] References Cited

U.S. PATENT DOCUMENTS

| | | | |
|---|---|---|---|
| 764,273 | 7/1904 | Denton et al. | 40/771 |
| 2,296,596 | 9/1942 | Brown | 40/760 |
| 3,687,770 | 8/1972 | Chase | 40/773 X |
| 3,736,685 | 6/1973 | Shibata | 40/773 X |
| 4,777,746 | 10/1988 | Brooks | 40/773 |
| 5,279,692 | 1/1994 | Best et al. | 40/773 X |

*Primary Examiner*—Jeff H. Aftergut
*Attorney, Agent, or Firm*—Raymond Y. Chan; David & Raymond

[57] ABSTRACT

A method of mounting an art sheet, such as picture or painting, includes the steps of placing the art sheet on a transparent base plate having a surface area larger than that of the art sheet; positioning said transparent base plate with the art sheet thereon between a transparent diaphragm and a oil paper; and pressing said transparent diaphragm and said transparent base plate together so as to seal up the art sheet between the transparent diaphragm and the transparent base plate. Such mounting method has an inexpensive cost as cheap as the low cost of regular laminating process and provides a high quality protection and nature to the picture or painting similar to the effect of framing, Furthermore, the mounting method also enables a picture or painting having an ultimate effect similar to be mounted within a frosted glass.

18 Claims, 3 Drawing Sheets

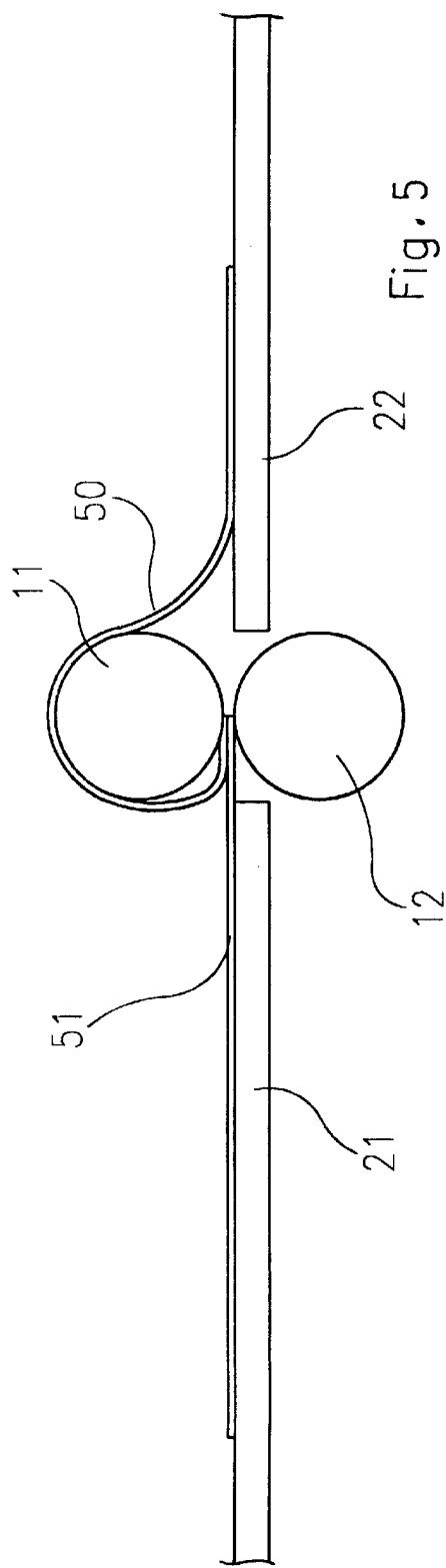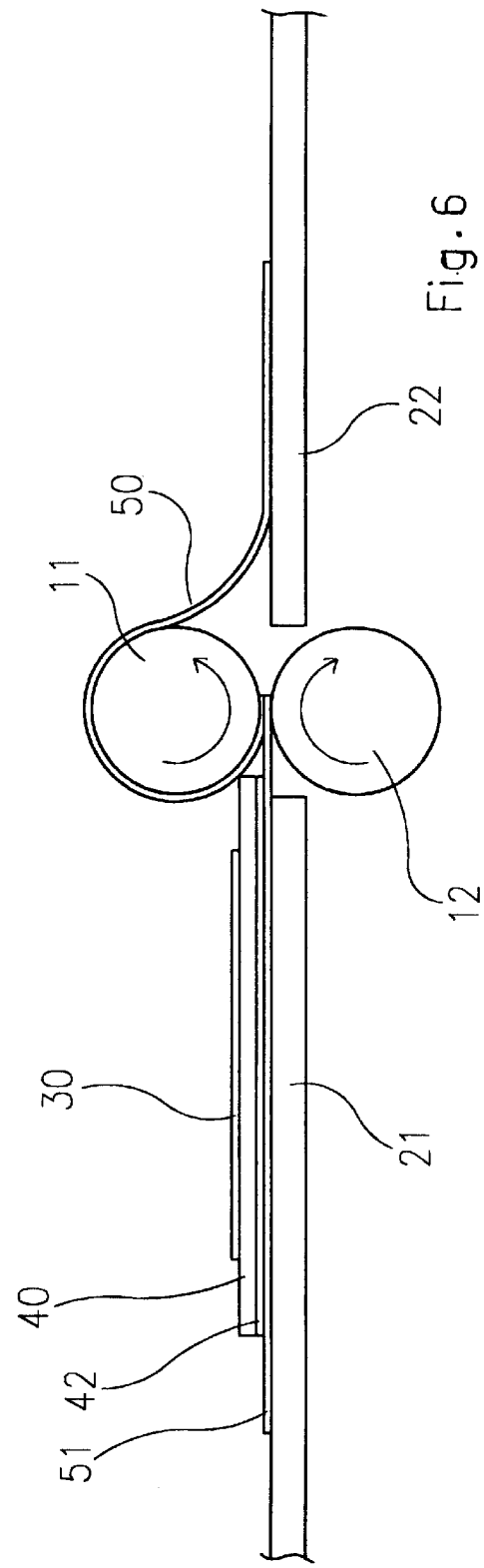

METHOD OF MOUNTING AN ART SHEET

FIELD OF THE PRESENT INVENTION

The present invention relates to a mounting method, and more particularly to a method of mounting an art sheet such as a sheet of picture, drawing or painting, having an inexpensive cost as cheap as the low cost of regular laminating and a high quality alike the effect of framing.

BACKGROUND OF THE PRESENT INVENTION

Two of the most usual and convenient ways to protect and preserve an art sheet such as picture or painting for long time are either to laminate the art sheet by means of a laminating machine or to frame the art sheet through a framing process. The conventional laminating process for picture includes the steps of positioning a picture between two transparent plastic sheets, applying heat and pressure to integrally affix the picture therebetween. Even though the laminated art sheet such as a picture can last long time, the quality and the nature of the picture comparatively decays. The conventional framing process for painting, or enlarged picture usually can obtain higher quality than the laminating process but it consumes much more framing time which increases the operating cost relatively.

The applicant experiences years of knowledge in the relating field of laminating and framing and provides a novel method of mounting an art sheet after many trials. The mounting method of the present invention enables a picture or painting having an ultimate effect similar to be mounted within a frosted glass.

SUMMARY OF THE PRESENT INVENTION

The main objective of the present invention is to provide a method of mounting an art sheet which has an inexpensive cost as cheap as the low cost of regular laminating process and provides a high quality protection and nature to the picture or painting similar to the effect of framing.

Another objective of the present invention is to provide a method of mounting an art sheet which enables a picture or painting having an ultimate effect similar to be mounted within a frosted glass.

Accordingly, the present invention provides a method of mounting an art sheet, such as picture or painting, including the steps of placing the art sheet on a transparent base plate having a surface area larger than that of the art sheet; positioning said transparent base plate with the art sheet thereon between a transparent diaphragm and a oil paper; and pressing said transparent diaphragm and said transparent base plate together so as to seal up the art sheet between the transparent diaphragm and the transparent base plate. Such mounting method has an inexpensive cost as cheap as the low cost of regular laminating process and provides a high quality protection and nature to the picture or painting similar to the effect of framing. Furthermore, the mounting method also enables a picture or painting having an ultimate effect similar to be mounted within a frosted glass.

BRIEF DESCRIPTION OF DRAWINGS

FIG. 5 is an end view of the calender roller illustrating the relative positions of the transparent diaphragm and the calender roller after the completion of step 5.

FIG. 6 is an end view of the calender roller, illustrating the relative positions of the transparent diaphragm and the transparent base plate, which has an art sheet disposed thereon, on the calender roller after the completion of step 6.

DETAILED DESCRIPTION OF THE PREFERRED EMBODIMENT

Figure 1:
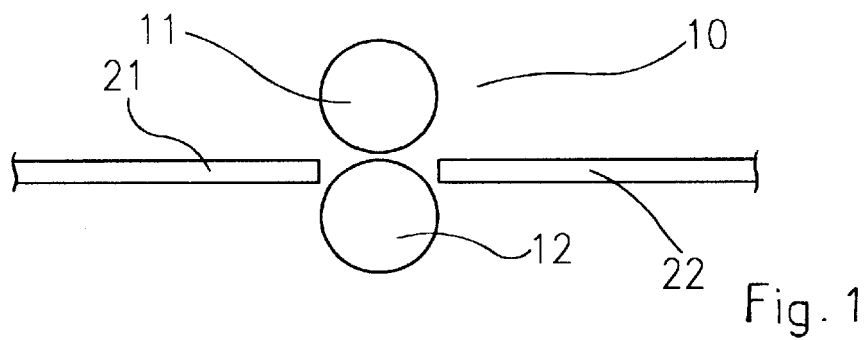
FIG. 1 is an end view of a calender roller utilizing in the present invention.

Referring to FIG. 1 of the drawings, a calender roller 10 which incorporated with a method of mounting an art sheet according to the present invention is illustrated. The calender roller 10 comprises an upper roller 11 and a lower roller 12. On each opposing side of the calender roller 10, a front platen 21 and a back platen 22 are provided, in which the top surfaces of the front platen 21 and the back platen 22 are in the same plane with a top tip of the lower roller 12.

In accordance with the present invention, the method of mounting an art sheet such as a paper picture and a paper or fabric painting comprises the steps as follows.

Figure 2:
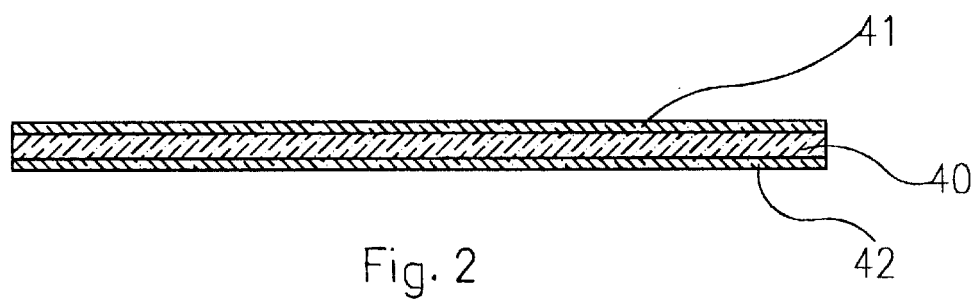
FIG. 2 is a sectional end view of a transparent base plate according to the present invention.

1. As shown in FIG. 2, make a transparent base plate 40, such as an acrylic, plastic or polyvinyl chloride (PVC) plate, which has a base plate surface area larger than a surface area of an art sheet 30 such as a picture or a painting, wherein a front and a back thin transparent paper layers 41, 42 are detachably adhered on a front surface and a back surface of the transparent base plate 40 respectively.

2. Place the art sheet 30 flatly on the back thin transparent paper layer 42 in such a manner that a periphery space is reserved around four sides of the art sheet 30 on the back thin transparent paper layer 42.

Figure 3:
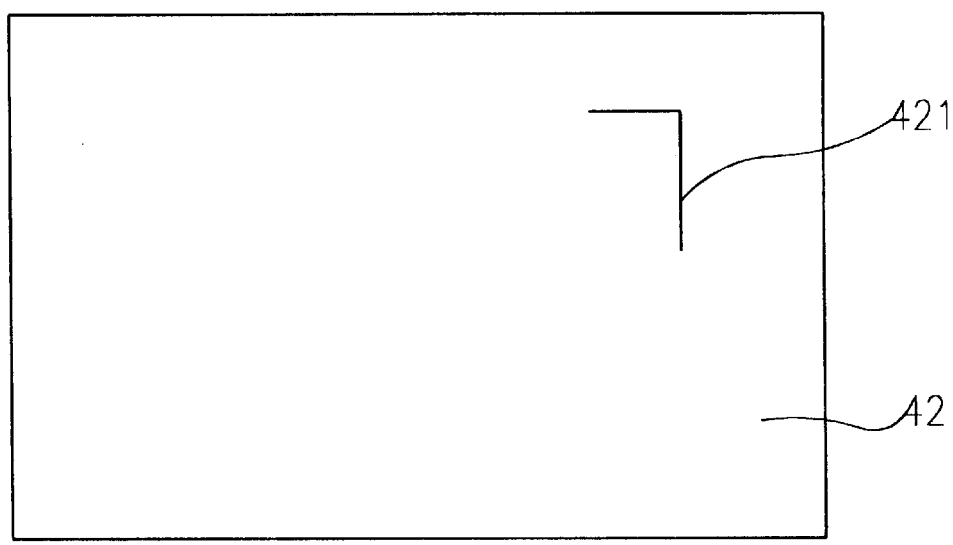
FIG. 3 is a front view of the transparent base plate according to the present invention, illustrating a thin paper layer disposed on a back surface of the transparent base plate with a position mark.

3. Marking at least a position mark 421 around a corner of the art sheet 30 to mark up a positioning location of the art sheet 30 on the back thin transparent paper layer 42 which is detachably adhered on the back surface of the transparent base plate 40, as shown in FIG. 3.

4. Remove the art sheet 30 and turn upside down the transparent base plate 40.

5. Tear off the front thin transparent paper layer 41 from the front surface of the transparent base plate 40.

6. Flatly attach the art sheet 30 on the front surface of the transparent base plate 40 and line up with the position mark 421 provided on the back thin transparent paper layer 42 by adhering a back surface of the art sheet with the front surface of the transparent base plate 40 with at least a double-side tape.

Figure 4:
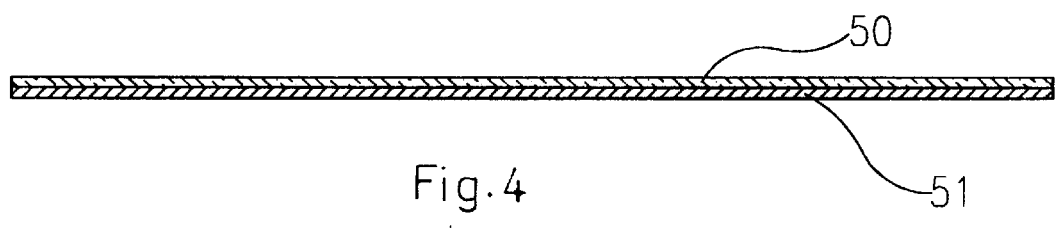
FIG. 4 is a sectional end view of a transparent diaphragm according to the present invention.

7. Make a transparent diaphragm 50 with one or more preprinted figure thereon, wherein the transparent diaphragm 50 has a diaphragm surface area larger than the predetermined base plate surface area of the transparent base plate 40, and that a layer oil paper 51 is detachably adhered on a back surface of the transparent diaphragm 50, as shown in FIG. 4.

8. Partially uplifting the transparent diaphragm 50 from the oil paper 51 until an end edge of the transparent diaphragm 50 is still remained adhering on the oil paper 51, and insert the adhering end edge of the transparent diaphragm 50 with the oil paper 51 between the upper roller 11 and the lower roller 12 of the calender rollers 10, wherein the uplifted portion of the transparent diaphragm 50 is laid over an upper portion of the upper roller 11, as shown in FIG. 5.

9. Position the transparent base plate 40 with the art sheet 30 attached on the front surface thereof on the oil paper 51, i.e. between the transparent diaphragm 50 and the oil paper 51, wherein the back thin transparent paper layer 42 of the transparent base plate 40 is closely in contact with the oil paper 51, and that an end side of the transparent base plate 40 is held to prop between the upper roller 11 and the lower roller 12 of the calender roller 10, as shown in FIG. 6.

Figure 7:
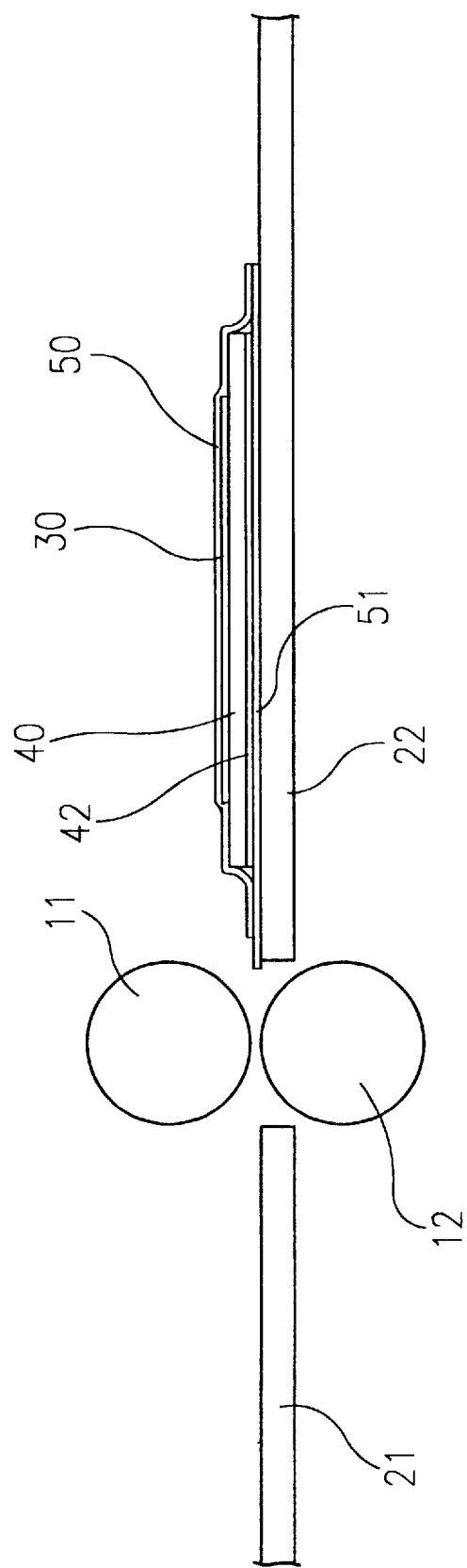
FIG. 7 is an end view of the calender roller, illustrating the mounted art sheet on the calender roller after the completion of step 7.

10. Evenly press the transparent diaphragm 50 and the transparent base plate 40 together by feeding the transparent diaphragm 50, the oil paper 51, and the transparent base plate 40 with the art sheet attached thereon between the upper and lower rollers 11, 12 of the calender roller 10, so as to seal up the art sheet and the front surface of the transparent base plate 40 with the transparent diaphragm 50 This step is carried out by rotating the upper and lower rollers 11, 12 of the calender roller 10 in opposite direction. Therefore, the transparent diaphragm 50 would seal with the transparent base plate 40 and the art sheet 30 would be sealed therebetween, as shown in FIG. 7.

11. Cut off an excessive portion of the transparent diaphragm 50 which is formed around the transparent base plate 40.

12. Tear off the oil paper 51 and the back thin paper layer 42 from the back surface of the transparent base plate 40.

The high quality product produced by the mounting method of the present invention is as good as mounting putting the picture or painting within a frosted glass. The processing cost of the present invention is relatively as low as the conventional laminating process, however the quality achieved is comparable with framing. Of course, according to the present invention, the transparent diaphragm 50 can be printed with pictures or wordings instead of figures in order to create different effect.

An additional step of sprinkling a predetermined amount of glitter dust or other similar powder on the back surface of the transparent diaphragm 50, especially the periphery portion which is not going to be covered by the art sheet 30, can be added before step 10 to the above disclosed mounting method. Accordingly, the glitter dust or other powder can also be sealed between the transparent base plate 40 and the transparent diaphragm 50 for providing different outlook of the final product.

The edges of the front surface of the transparent base plate 40 of the present invention can also provide indented wordings or pictorial patterns, so that when the final product may provides hollow wordings or pictures thereon. If fillers are added to fill the indented wordings or pictures, such the wordings or pictures will become stereographic.

I claim:

1. A method of mounting an art sheet comprising the steps of:

(a) making a transparent base plate to have a base plate surface area larger than a surface area of said art sheet, wherein a front and a back thin transparent paper layers are detachably adhered on a front surface and a back surface of said transparent base plate respectively;

(b) placing said art sheet flatly on said back thin transparent paper layer in such a manner that a periphery space is reserved around said art sheet on said back thin transparent paper layer;

(c) marking at least a position mark along said art sheet to mark up a positioning location for said art sheet on said back thin transparent paper layer which is detachably adhered on said back surface of said transparent base plate;

(d) removing said art sheet and turn upside down said transparent base plate;

(e) tearing off said front thin transparent paper layer from said front surface of said transparent base plate;

(f) flatly attaching said art sheet on said front surface of said transparent base plate and line up with said position mark provided on said back thin transparent paper layer by adhering a back surface of said art sheet with said front surface of said transparent base plate;

(g) making a transparent diaphragm with a predetermined pattern thereon, wherein said transparent diaphragm has a diaphragm Surface area larger than said predetermined base plate surface area of said transparent base plate and that a layer oil paper is detachably adhered on a back surface of said transparent diaphragm;

(h) positioning said transparent base plate with said art sheet attached on said front surface thereof between said oil paper and said transparent diaphragm, wherein said back thin transparent paper layer of said transparent base plate is closely in contact with said oil paper;

(i) partially uplifting said transparent diaphragm from said oil paper until an end edge of said transparent diaphragm is still remained adhering on said oil paper;

(j) inserting said adhering end edge of said transparent diaphragm with said oil paper between an upper roller and a lower roller of a calender rollers, wherein said uplifted portion of said transparent diaphragm is laid over an upper portion of said upper roller;

(k) positioning said transparent base plate with said art sheet attached on said front surface thereof on said oil paper, wherein an end side of said transparent base plate is held to prop between said upper roller and said lower roller of said calender roller; and (l) feeding said transparent diaphragm, said oil paper, and said transparent base plate with said art sheet attached thereon between said upper and lower rollers of said calender roller by rotating said upper and lower rollers of said calender roller in opposite direction, so as to evenly press said transparent diaphragm and said transparent base plate together to seal up said art sheet and said front surface of said transparent base plate with said transparent diaphragm; and (m) cutting off an excessive portion of said transparent diaphragm which is formed around said transparent base plate.

2. A method of mounting an art sheet, as recited in claim 1, after said step (m), further comprising a step of tearing off said oil paper and said back thin paper layer from said back surface of said transparent base plate.

3. A method of mounting an ail sheet, as recited in claim 2, wherein, in said step (f), said art sheet is attached on said front surface of said transparent base plate by adhering a back surface of said art sheet with said front surface of said transparent base plate with at least a double-side tape.

4. A method of mounting an art sheet, as recited in claim 3, wherein, in said step (g), said predetermined pattern includes at least a preprinted figure.

5. A method of mounting an art sheet, as recited in claim 4, wherein said predetermined pattern further includes at least a wording.

6. A method of mounting an art sheet as recited in claim 3, before said step (i), further comprising an additional step of sprinkling a predetermined amount of glitter dust on said back surface of said transparent diaphragm, therefore said glitter dust is sealed between said transparent base plate and said transparent diaphragm.

7. A method of mounting an art sheet, as recited in claim 2, wherein said edges of said front surface of said transparent base plate provides at least an indented pattern.

8. A method of mounting an art sheet, as recited in claim 7, wherein said indented pattern is filled with a filler to achieve stereographic effect.

9. A method of mounting an art sheet as recited in claim 2, wherein, in said step (g), said predetermined pattern includes at least a preprinted figure.

10. A method of mounting an art sheet, as recited in claim 2, before said step (i), further comprising an additional step of sprinkling a predetermined amount of glitter dust on said back surface of said transparent diaphragm, therefore said glitter dust is sealed between said transparent base plate and said transparent diaphragm.

11. A method of mounting an art sheet, as recited in claim 1, wherein edges of said front surface of said transparent base plate provides at least an indented pattern.

12. A method of mounting an art sheet, as recited in claim 11, wherein said indented pattern is filled with a filler to achieve stereographic effect.

13. A method of mounting an air sheet, as recited in claim 1, wherein, in said step (f), said art sheet is attached on said front surface of said transparent base plate by adhering a back surface of said art sheet with said front surface of said transparent base plate with at least a double-side tape.

14. A method of mounting an art sheet, as recited in claim 1, wherein, in said step (g), said predetermined pattern includes at least a preprinted figure.

15. A method of mounting an art sheet, as recited in claim 1, wherein, in said step (g), said predetermined pattern includes at least a wording.

16. A method of mounting an art sheet, as recited in claim 1, before said step (i), further comprising an additional step of sprinkling a predetermined amount of glitter dust on said back surface of said transparent diaphragm, therefore said glitter dust is sealed between said transparent base plate and said transparent diaphragm.

17. A method of mounting an art sheet, as recited in claim 1, wherein said transparent base plate is an acrylic plate.

18. A method of mounting an art sheet, as recited in claim 1, wherein said transparent base plate is a polyvinyl chloride plate.

* * * * *